(12) United States Patent
Lust

(10) Patent No.: US 10,782,133 B2
(45) Date of Patent: Sep. 22, 2020

(54) GEOLOCATION SENSOR

(71) Applicant: Honeywell International Inc., Morris Plains, NJ (US)

(72) Inventor: Lisa Lust, Plymouth, MN (US)

(73) Assignee: Honeywell International Inc., Morris Plains, NJ (US)

( * ) Notice: Subject to any disclaimer, the term of this patent is extended or adjusted under 35 U.S.C. 154(b) by 274 days.

(21) Appl. No.: 15/921,086

(22) Filed: Mar. 14, 2018

(65) Prior Publication Data
US 2018/0266827 A1  Sep. 20, 2018

Related U.S. Application Data

(60) Provisional application No. 62/471,757, filed on Mar. 15, 2017.

(51) Int. Cl.
*G01C 21/02* (2006.01)
*G01C 17/00* (2006.01)

(52) U.S. Cl.
CPC .............. *G01C 21/02* (2013.01); *G01C 17/00* (2013.01)

(58) Field of Classification Search
CPC ....................................................... G01C 21/02
USPC ........................... 33/268; 356/139.01, 139.02
See application file for complete search history.

(56) References Cited

U.S. PATENT DOCUMENTS

| | | | | |
|---|---|---|---|---|
| 4,018,532 A * | 4/1977 | Fletcher | .................. | G01B 11/26 356/139.02 |
| 4,333,243 A * | 6/1982 | McLaughlin | .......... | G01C 21/02 33/268 |
| 4,449,817 A * | 5/1984 | Abler | ........................ | G01C 1/08 33/268 |
| 4,794,245 A * | 12/1988 | Auer | ........................ | G01S 3/784 250/206.2 |
| 6,274,862 B1 * | 8/2001 | Rieger | ..................... | G01S 3/784 250/203.4 |
| 6,490,801 B1 * | 12/2002 | Hersom | .................... | B64G 1/36 33/268 |
| 8,333,016 B1 * | 12/2012 | Keele | ...................... | G04B 49/04 33/270 |
| 8,597,025 B2 * | 12/2013 | Belenkii | .................... | F41G 3/26 434/16 |
| 2007/0150198 A1 * | 6/2007 | MacDonald | .......... | G01J 1/0266 702/2 |
| 2010/0283840 A1 * | 11/2010 | Belenkii | ................ | G01C 21/02 348/61 |
| 2013/0314699 A1 * | 11/2013 | Jungerman | ........... | G01J 1/0266 356/139.01 |
| 2013/0325316 A1 * | 12/2013 | Vos | ......................... | G01C 17/34 701/408 |
| 2017/0131096 A1 * | 5/2017 | Karlov | ...................... | G01C 1/08 |

* cited by examiner

*Primary Examiner* — Christopher W Fulton
(74) *Attorney, Agent, or Firm* — Brooks, Cameron & Huebsch, PLLC

(57) ABSTRACT

Geolocation sensor devices, methods, and systems are described herein. One geolocation sensor device includes an optical position sensor configured to receive sunlight and determine a current angular position of the sun relative to the geolocation sensor device based, at least in part, on the received sunlight, a memory, and a processor configured to execute executable instructions stored in the memory to determine a current location of the geolocation sensor device based, at least in part, on the determined current angular position of the sun and a current time of day.

18 Claims, 3 Drawing Sheets

US 10,782,133 B2

GEOLOCATION SENSOR

PRIORITY INFORMATION

This application is a Non-Provisional of U.S. Provisional Application No. 62/471,757, filed Mar. 15, 2017, the contents of which are incorporated herein by reference.

TECHNICAL FIELD

The present disclosure relates generally to geolocation sensor devices, methods, and systems.

BACKGROUND

Many different types of sensors and/or devices can be utilized to determine and/or provide a user's location (e.g., the current latitude and longitude of the user). For example, previous geolocation sensors and/or devices may utilize (e.g., rely on) satellite-based navigation systems, such as, for instance, Global Positioning System (GPS) information and/or services, to determine and/or provide a user's location. For instance, a GPS-based geolocation sensor may receive signals from GPS satellites, and use these signals to determine (e.g., calculate) its current location.

Such GPS-reliant sensors and/or devices, however, may be incapable of determining and/or providing the user's location when the GPS information and/or services are unavailable. For instance, a GPS-based geolocation sensor may need to have immediate access to the signals from the GPS satellites to determine and/or provide the user's location; if the sensor is unable to receive the signals from the GPS satellites (e.g., because the signals are blocked), it may be unable to determine its current location.

DETAILED DESCRIPTION

Figure 1:
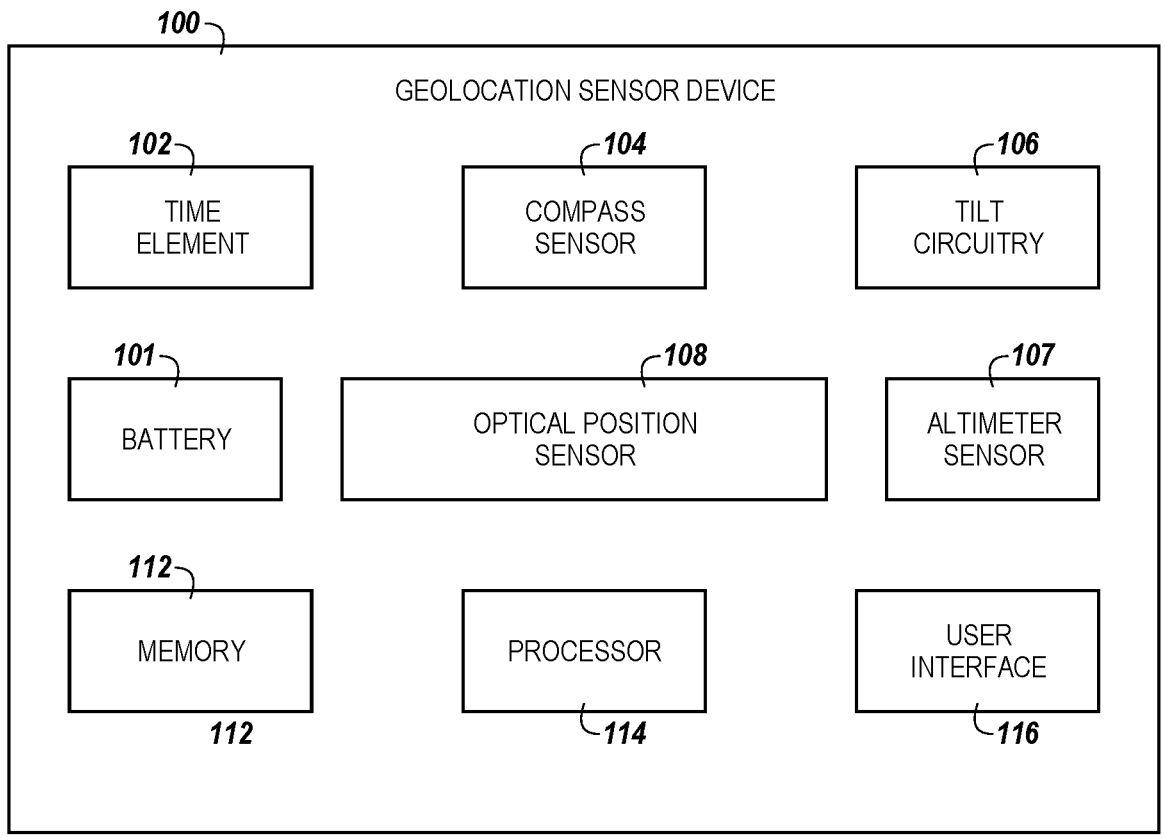
FIG. 1 illustrates an example of a geolocation sensor device in accordance with an embodiment of the present disclosure.

Geolocation sensor devices, methods, and systems are described herein. For example, an embodiment includes an optical position sensor configured to receive sunlight and determine a current angular position of the sun relative to the geolocation sensor device based, at least in part, on the received sunlight, a memory, and a processor configured to execute executable instructions stored in the memory to determine a current location of the geolocation sensor device based, at least in part, on the determined current angular position of the sun and a current time of day.

A geolocation sensor in accordance with embodiments of the present disclosure can determine and/or provide a user's location, such as the user's current latitude and longitude, without the use of satellite-based navigation systems, such as Global Positioning System (GPS) information and/or services. A geolocation sensor that can determine and/or provide a user's location without the use of GPS information and/or services in accordance with the present disclosure can be more useful and/or reliable that previous geolocation sensors that may utilize (e.g., rely on) GPS information and/or services to determine their location.

For example, in contrast to such previous geolocation sensors, a geolocation sensor in accordance with the present disclosure can determine and/or provide a user's location when (e.g., even if) GPS information and/or services are unavailable (e.g., not immediately accessible). For instance, a geolocation sensor in accordance with the present disclosure can determine its location even if it is unable to receive signals from the GPS satellites (e.g., because the signals are blocked).

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that mechanical, electrical, and/or process changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits. For example, 108 may reference element "08" in FIG. 1, and a similar element may be referenced as 208 in FIGS. 2A, 2B, and 2C.

As used herein, "a" or "a number of" something can refer to one or more such things, while "a plurality of" something can refer to more than one such things. For example, "a number of components" can refer to one or more devices, while "a plurality of components" can refer to more than one device.

FIG. 1 illustrates an example of a geolocation sensor device 100 in accordance with an embodiment of the present disclosure. For example, geolocation sensor device 100 can determine and/or provide a user's location, such as the user's current (e.g. instantaneous) latitude and longitude, without the use of GPS information and/or services (e.g., without the use of signals from GPS satellites).

Geolocation sensor device 100 can be, for example, a mobile (e.g., hand-held) device. In the example illustrated in FIG. 1, geolocation sensor device 100 is illustrated as a stand-alone device. However, embodiments of the present disclosure are not so limited. For example, in some embodiments, geolocation sensor device 100 (e.g., the capabilities and functionality of geolocation sensor device 100) can be part of (e.g., included within) another mobile device, such as, for instance, a smart phone or other mobile navigational device.

As shown in FIG. 1, geolocation sensor device 100 can include a battery 101. Battery 101 can be any type of battery that can provide (e.g., supply) geolocation sensor device 100 with power (e.g., electric power) for operation.

As shown in FIG. 1, geolocation sensor device 100 can include a time element 102 that can determine the current time of day. For example, time element 102 can be set to Coordinated Universal Time (UTC) or Greenwich Mean Time (GMT), and determine the current time of day based on this setting.

As shown in FIG. 1, geolocation sensor device 100 can include a compass sensor 104. Compass sensor 104 can be, for example, a digital or analog output compass sensor. For instance, compass sensor 104 can be a solid-state microelectromechanical systems (MEMS) compass sensor that outputs a digital or analog signal proportional to its directional orientation.

Compass sensor 104 can determine the current relative cardinal direction of geolocation sensor device 100 (e.g., the current geographic cardinal direction the device is facing while being held by the user). For instance, compass sensor 104 can determine the current relative cardinal direction of geolocation sensor device 100 with a declination estimate for the device based, at least in part, on an estimated current latitude of the device.

As shown in FIG. 1, geolocation sensor device 100 can include tilt circuitry (e.g., tilt sensor) 106, such as, for instance, a clinometer or inclinometer. For example, tilt circuitry 106 can comprise an accelerometer that can determine the direction of gravity relative to geolocation sensor device 100.

Tilt circuitry 106 can determine (e.g., measure) the current relative angular position of geolocation sensor device 100. For instance, tilt circuitry 106 can determine the current angular offset (e.g., tilt) of geolocation sensor device 100 with respect to gravity (e.g., from the gravitational level). That is, tilt circuitry 106 can determine the current angle of geolocation sensor device 100 (e.g., the angle at which the device is being held by the user) with respect to the direction of the force of gravity.

As shown in FIG. 1, geolocation sensor device 100 can include an altimeter sensor 107 that can determine (e.g., measure) the current altitude of geolocation sensor device 100. For instance, altimeter sensor 107 can determine the current height of geolocation sensor device 100 above ground level (e.g., while the device is being held by the user).

As shown in FIG. 1, geolocation sensor device 100 can include an optical position sensor 108. Optical position sensor 108 can include a position sensitive detector, and a window that covers (e.g., blocks) the position sensitive detector and includes an aperture (e.g., pinhole), as will be further described herein (e.g., in connection with FIGS. 2A-2C).

Optical position sensor 108 can receive sunlight from the sun while facing the sun (e.g., while the user is holding geolocation sensor device 100 towards the sun). For example, the surface of the position sensitive detector of geolocation sensor device 100 can receive direct or diffuse sunlight that passes through the aperture of geolocation sensor device 100.

Optical position sensor 108 can determine the current (e.g., instantaneous) angular position of the sun relative to geolocation sensor device 100 (e.g., the angle at which the sunlight hits the device) based, at least in part, on the received sunlight. For instance, the position sensitive detector of optical position sensor 108 can determine the current angular position of the sun relative to geolocation sensor device 100 by measuring the position of the received sunlight on its surface. As such, the received sunlight can provide optical position sensor 108 with a location indicative of the current angular position of the sun.

The information from optical position sensor 108 (e.g., the current angular position of the sun determined by optical position sensor 108) can be used to determine the current (e.g. instantaneous) location (e.g., the current longitude and latitude) of geolocation sensor device 100 (e.g., the current location of the user of geolocation sensor device 100). For example, the current location of geolocation sensor device 100 can be determined based on the current angular position of the sun determined by optical position sensor 108, in combination with the information from time element 102 (e.g., the current time of day determined by time element 102), the information from compass sensor 104 (e.g., the current relative cardinal direction of geolocation sensor device 100 determined by compass sensor 104), and the information from tilt circuitry 106 (e.g., the current relative angular position of geolocation sensor device 100 determined by tilt circuitry 106). For instance, the current angular position of the sun, in combination with the current relative cardinal direction and current relative angular position of geolocation sensor device 100, can be used to determine (e.g., calculate) the current (e.g. instantaneous) altitude (e.g., zenith distance) and azimuth position of the sun relative to geolocation sensor device 100 for the current time of day, and this determined current altitude and azimuth position of the sun can be used to determine (e.g., calculate) the current longitude and latitude) of geolocation sensor device 100.

As such, geolocation sensor device 100 can determine its current location (e.g., the current location of the user of geolocation sensor device 100) without using GPS information and/or services, such as signals from GPS satellites. For example, geolocation sensor device 100 can determine its current location based, at least in part, on the current angular position of the sun determined by optical position sensor 108 and the current time of day determined by time element 102, in combination with the current relative cardinal direction of geolocation sensor device 100 determined by compass sensor 104 and/or the current relative angular position of geolocation sensor device 100 determined by tilt circuitry 106).

For example, as shown in FIG. 1, geolocation sensor device 100 can include a memory 112 and a processor 114. Memory 112 can be any type of storage medium that can be accessed by processor 114 to perform various examples of the present disclosure. For example, memory 112 can be a non-transitory computer readable medium having computer readable instructions (e.g., computer program instructions) stored thereon that are executable by processor 114 to determine and/or provide the current location of geolocation sensor device 100 in accordance with the present disclosure. That is, processor 116 can execute the executable instructions stored in memory 114 to determine and/or provide the current location of geolocation sensor device 100 in accordance with the present disclosure.

For example, memory 112 may include an algorithm that can calculate the current location of geolocation sensor device 100 based, at least in part, on the current angular position of the sun determined by optical position sensor 108, the current time of day determined by time element 102, the current relative cardinal direction of geolocation sensor device 100 determined by compass sensor 104, and the current relative angular position of geolocation sensor device 100 determined by tilt circuitry 106. For instance, the algorithm may calculate the current altitude (e.g., zenith distance) and azimuth position of the sun relative to geolocation sensor device 100 for the current time of day using the current angular position of the sun, the current relative cardinal direction of geolocation sensor device 100, and the current relative angular position of geolocation sensor device 100, and then calculate the current longitude and latitude of geolocation sensor device 100 using the current altitude and azimuth position of the sun relative to geolocation sensor device 100 for the current time of day.

Memory 112 can be volatile or nonvolatile memory. Memory 112 can also be removable (e.g., portable) memory, or non-removable (e.g., internal) memory. For example, memory 112 can be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disk read-only memory (CD-ROM)), flash memory, a laser disk, a digital versatile disk (DVD) or other optical disk storage, and/or a magnetic medium such as magnetic cassettes, tapes, or disks, among other types of memory.

Further, although memory 112 is illustrated as being located in geolocation sensor device 100, embodiments of the present disclosure are not so limited. For example, memory 112 can also be located internal to another computing resource (e.g., enabling computer readable instructions to be downloaded over the Internet or another wired or wireless connection).

As shown in FIG. 1, geolocation sensor device 100 can include a user interface 116. A user (e.g., operator) of geolocation sensor device 100 can interact with geolocation sensor device 100 via user interface 116. For example, user interface 116 can provide (e.g., display) information to and/or receive information from (e.g., input by) the user of geolocation sensor device 100. For instance, user interface 116 can provide (e.g., display) the current location (e.g., the current longitude and latitude) of geolocation sensor device 100 (e.g., the current location of the user of geolocation sensor device 100) determined by geolocation sensor device 100 to the user.

In some embodiments, user interface 116 can be a graphical user interface (GUI) that can include a display (e.g., a screen) that can provide and/or receive information to and/or from the user of geolocation sensor device 100. The display can be, for instance, a touch-screen (e.g., the GUI can include touch-screen capabilities). Embodiments of the present disclosure, however, are not limited to a particular type(s) of user interface. For instance, in some embodiments, user interface 116 can be and/or include a speaker that can aurally provide and/or receive information to and/or from the user.

Although not shown in FIG. 1 for clarity and so as not to obscure embodiments of the present disclosure, in some embodiments geolocation sensor device 100 may optionally include a GPS sensor that can determine the current location of geolocation sensor device 100 using GPS information and/or services, such as signals from GPS satellites, when such information and/or services are available to (e.g., accessible by) geolocation sensor device 100. In such embodiments, the capability of geolocation sensor device 100 to determine its current location without using GPS information and/or services as described herein may be used (e.g., serve) as a back-up to the GPS sensor. For instance, in such embodiments, geolocation sensor device 100 may determine its current location without using GPS information and/or services (e.g., without using the GPS sensor) only when such GPS information and/or services are unavailable to (e.g., not immediately accessible by) the GPS sensor.

Figure 2A:
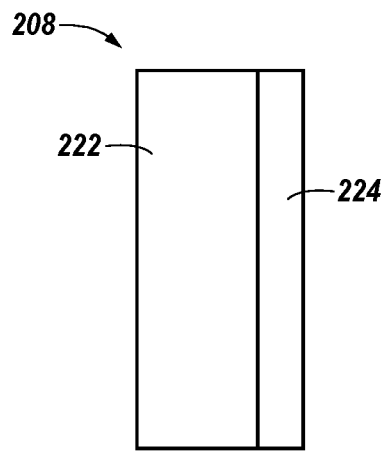
FIG. 2A illustrates a side view of an optical position sensor of a geolocation sensor device in accordance with an embodiment of the present disclosure.
Figure 2B:
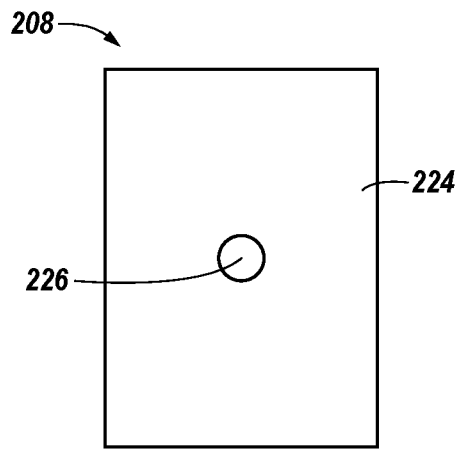
FIG. 2B illustrates a front view of an optical position sensor of a geolocation sensor device in accordance with an embodiment of the present disclosure.
Figure 2C:
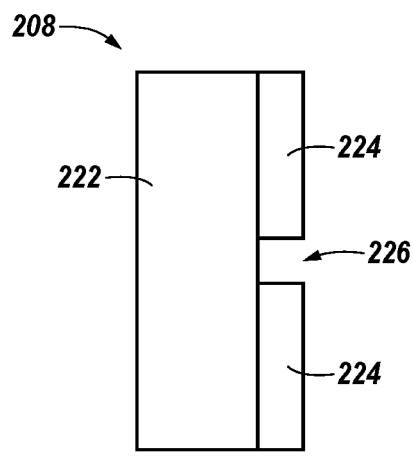
FIG. 2C illustrates a cross-sectional view of an optical position sensor of a geolocation sensor device in accordance with an embodiment of the present disclosure.

FIGS. 2A-2C illustrate various views of an optical position sensor 208 of a geolocation sensor device in accordance with an embodiment of the present disclosure. For example, FIG. 2A illustrates a side view of optical position sensor 208, FIG. 2B illustrates a front view of optical position sensor 208, and FIG. 2C illustrates a cross-sectional view of optical position sensor 208.

Optical position sensor 208 can be, for example, optical position sensor 108 of geolocation sensor device 100 previously described in connection with FIG. 1. For instance, optical position sensor 208 can determine (e.g., measure) the current (e.g., instantaneous) angular position of the sun relative to geolocation sensor device 100, as previously described herein.

For example, as shown in FIGS. 2A-2C, optical position sensor 208 can include a position sensitive detector 222, and a window 224 that covers (e.g., blocks) position sensitive detector 222. Window 224 can include an aperture (e.g., pinhole opening) 226 through which sunlight (e.g., direct or diffuse sunlight) from the sun can pass, as illustrated in FIGS. 2B and 2C.

The sunlight that passes through aperture 226 of window 224 can be received by the surface of position sensitive detector 222 (e.g., by the portion of the surface of position sensitive detector 222 that is not blocked by window 224). Position sensitive detector 222 can measure the position of the sunlight received on its surface (e.g., the position on its surface at which the sunlight is received) to determine the current angular position of the sun.

Position sensitive detector 222 can comprise a photodiode, such as, for instance, a PIN diode on a laminar semiconductor material, or a PIN diode having a resistive layer. Further, position sensitive detector 222 can be a two-dimensional (e.g., two-axis) position sensitive detector. For instance, position sensitive detector 222 can measure the position of the sunlight on its surface in two-dimensions (e.g., both lateral directions of its surface) to determine the current angular position of the sun.

Window 224 can have a low index of refraction. For instance, window 224 can comprise an opaque material that does not allow any sunlight to pass therethrough (e.g., the only sunlight that passes through to the surface of position sensitive detector 222 is the sunlight that passes through aperture 226). Further, the diameter of opening can depend on, for example, the thickness of window 224, the semiconductor properties of position sensitive detector 222, and/or the lateral dimensions of position sensitive detector 222.

Figure 3:
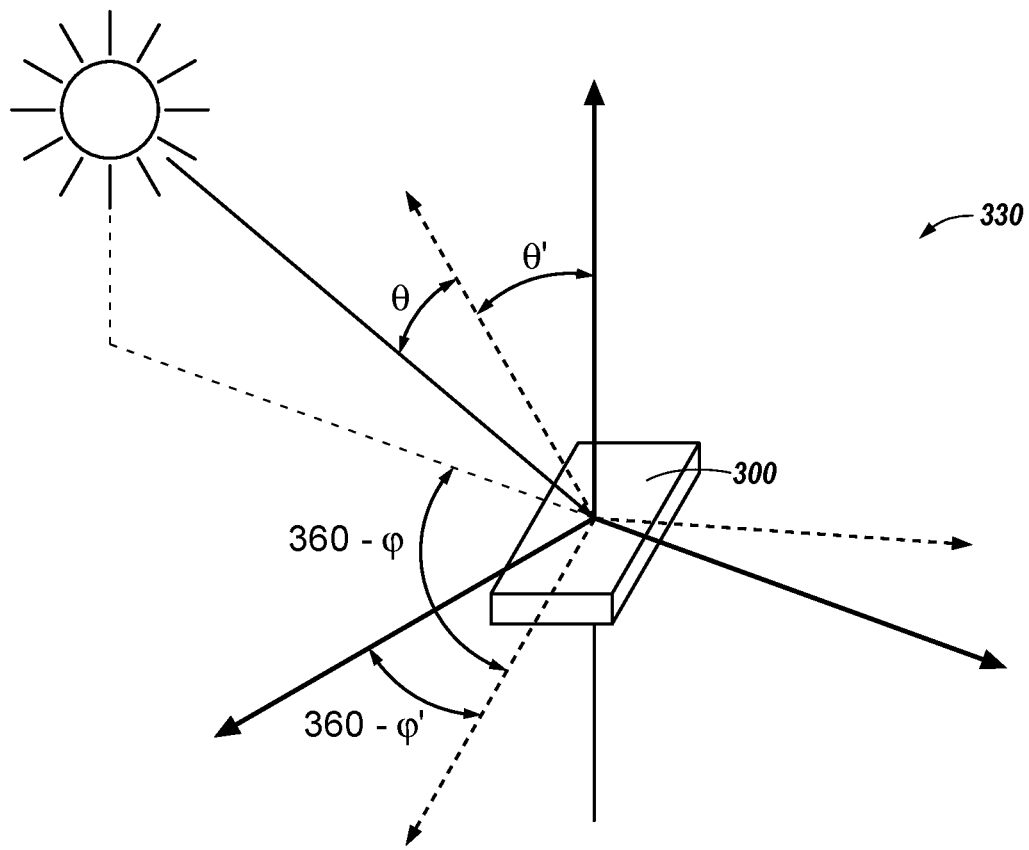
FIG. 3 illustrates an example positioning of a geolocation sensor device during operation in accordance with an embodiment of the present disclosure.

FIG. 3 illustrates an example positioning 330 of a geolocation sensor device 300 during operation in accordance with an embodiment of the present disclosure. Geolocation sensor device 300 can be, for example, geolocation sensor device 100 previously described in connection with FIG. 1.

In the example illustrated in FIG. 3, geolocation sensor device 300 (e.g., the optical position sensor of geolocation sensor device 300) is receiving sunlight from the sun (represented by the arrow from the sun shown in FIG. 3). For instance, a user (not shown in FIG. 3 for clarity and so as not to obscure embodiments of the present disclosure) of geolocation sensor device 300 may be holding geolocation sensor device 300 towards the sun (e.g., such that the optical position sensor is facing the sun).

In the example illustrated in FIG. 3, the angles θ and φ represent the current angular position of the sun relative (e.g., with respect) to geolocation sensor device 300. These angles can be determined by the optical position sensor of geolocation sensor device 300 (e.g., optical position sensor 108 previously described in connection with FIG. 1), as previously described herein.

Further, in the example illustrated in FIG. 3, the angles θ' and φ' represent the current angular position (e.g., orientation) of geolocation sensor device 300 relative (e.g., with respect to) the earth (e.g., ground level). These angles can be determined by measuring the current altitude of geolocation sensor device 300, the current direction of gravity (e.g., which direction is down) relative to geolocation sensor device 300, and the current relative cardinal direction of (e.g., which direction is north relative to) geolocation sensor device 300. The current altitude, relative gravitational direction, and relative cardinal direction, of geolocation sensor device 300 can be measured by the altimeter sensor, tilt circuitry, and compass sensor, respectively, (e.g., altimeter sensor 107, tilt circuitry 106, and compass sensor 104, respectively, previously described in connection with FIG. 1) of geolocation sensor device 300, as previously described herein.

The position of the sun relative to the earth (e.g., relative to the directions of gravity and north) can then be determined based on the current angular positions of the sun and geolocation sensor device 300 (e.g., by referencing angles θ and φ to the earth via θ' and φ'). The current longitude and latitude of geolocation sensor device 300 can then be determined based on the position of the sun relative to the earth and the current time of day.

Figure 4:
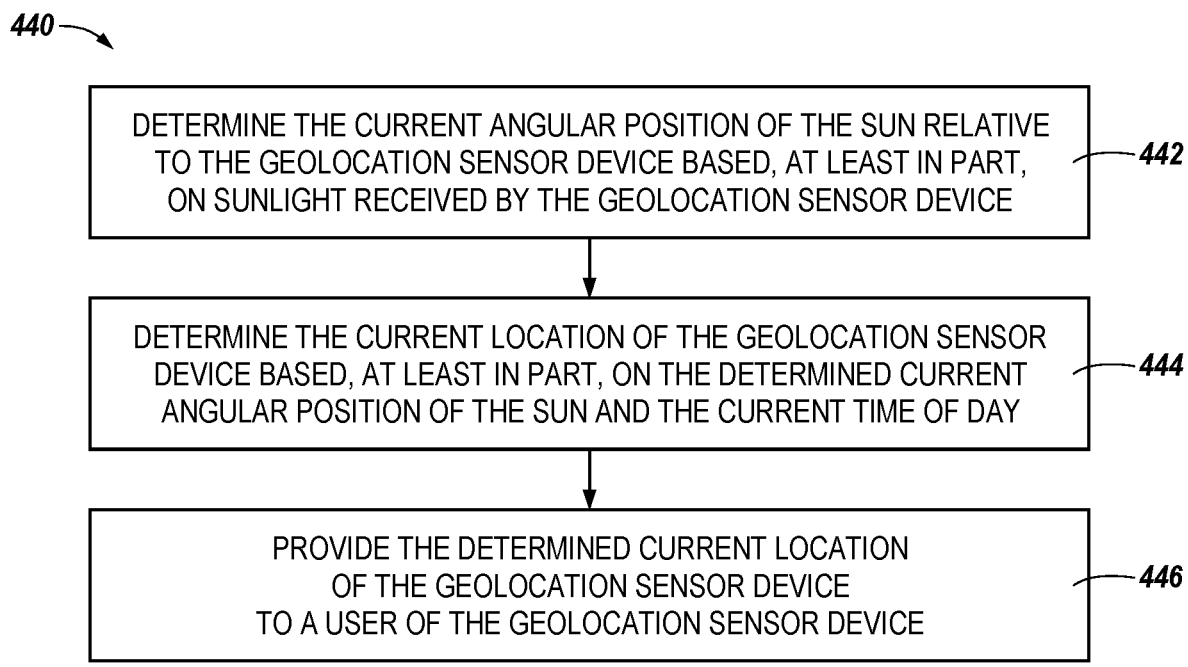
FIG. 4 illustrates an example method of operating a geolocation sensor device in accordance with an embodiment of the present disclosure.

FIG. 4 illustrates an example method 440 of operating a geolocation sensor device in accordance with an embodiment of the present disclosure. The geolocation sensor device can be, for example, geolocation sensor device 100 and/or 300 previously described herein in connection with FIGS. 1 and 3, respectively.

At block 442, method 440 includes determining the current angular position of the sun relative to the geolocation sensor device based, at least in part, on sunlight received by the geolocation sensor device. The current angular position of the sun relative to the geolocation sensor device can be determined, for instance, by an optical position sensor of the geolocation sensor device (e.g., optical position sensor 108 previously described in connection with FIG. 1), as previously described herein.

At block 444, method 440 includes determining the current location of the geolocation sensor device based, at least in part, on the determined current angular position of the sun and the current time of day. The current time of day can be determined, for instance, by a time element of the geolocation sensor device (e.g., time element 102 previously described in connection with FIG. 1), and the current location of the geolocation sensor device can be determined in a manner analogous to that previously described herein (e.g., in connection with FIG. 1).

At block 446, method 440 includes providing the determined current location of the geolocation sensor device to a user of the geolocation sensor device. The determined current location of the geolocation sensor device can be provided to the user, for instance, by a user interface of the geolocation sensor device (e.g. user interface 116 previously described in connection with FIG. 1), as previously described herein.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A geolocation sensor device, comprising:
   an optical position sensor, wherein the optical position sensor includes a position sensitive detector configured to:
      receive sunlight on a surface of the position sensitive detector; and
      determine a current angular position of the sun relative to the geolocation sensor device by measuring a position of the received sunlight on the surface of the position sensitive detector;
   a memory; and
   a processor configured to execute executable instructions stored in the memory to determine a current location of the geolocation sensor device based, at least in part, on the determined current angular position of the sun and a current time of day.

2. The geolocation sensor device of claim 1, wherein the geolocation sensor device includes a user interface configured to display the determined current location of the geolocation sensor device.

3. The geolocation sensor device of claim 1, wherein the geolocation sensor device includes a time element configured to determine the current time of day.

4. The geolocation sensor device of claim 1, wherein:
   the geolocation sensor device includes a compass sensor configured to determine a current relative cardinal direction of the geolocation sensor device; and
   the processor is configured to execute the instructions to determine the current location of the geolocation sensor device based, at least in part, on the determined current relative cardinal direction of the geolocation sensor device.

5. The geolocation sensor device of claim 4, wherein the compass sensor is configured to determine the current relative cardinal direction of the geolocation sensor device with a declination estimate for the geolocation sensor device based, at least in part, on an estimated latitude of the geolocation sensor device.

6. The geolocation sensor device of claim 1, wherein:
the geolocation sensor device includes tilt circuitry configured to determine a current relative angular position of the geolocation sensor device; and
the processor is configured to execute the instructions to determine the current location of the geolocation sensor device based, at least in part, on the determined current relative angular position of the geolocation sensor device.

7. The geolocation sensor device of claim 6, wherein the tilt circuitry comprises an accelerometer.

8. The geolocation sensor device of claim 1, wherein the optical position sensor includes an aperture through which the surface of the position sensitive detector of the optical position sensor receives the sunlight.

9. A method of operating a geolocation sensor device, comprising:
determining, by a position sensitive detector of the geolocation sensor device, a current angular position of the sun relative to the geolocation sensor device by:
receiving sunlight on a surface of the position sensitive detector of the geolocation sensor device; and
measuring a position of the received sunlight on the surface of the position sensitive detector of the geolocation sensor device;
determining, by the geolocation sensor device, a current location of the geolocation sensor device based, at least in part, on the determined current angular position of the sun and a current time of day; and
providing, by the geolocation sensor device, the determined current location of the geolocation sensor device to a user of the geolocation sensor device.

10. The method of claim 9, wherein the method includes determining the current location of the geolocation sensor device without using Global Positioning System (GPS) information.

11. The method of claim 9, wherein the method includes:
determining, by the geolocation sensor device, a current altitude and azimuth position of the sun relative to the geolocation sensor device based, at least in part, on the determined current angular position of the sun; and
determining, by the geolocation sensor device, the current location of the geolocation sensor device based, at least in part, on the determined current altitude and azimuth position of the sun.

12. The method of claim 9, wherein the method includes:
determining, by the geolocation sensor device, a current relative cardinal direction of the geolocation sensor device;
determining, by the geolocation sensor device, a current relative angular position of the geolocation sensor device; and
determining, by the geolocation sensor device, the current location of the geolocation sensor device based, at least in part, on the determined current relative cardinal direction of the geolocation sensor device and the determined current relative angular position of the geolocation sensor device.

13. The method of claim 9, wherein:
determining the current location of the geolocation sensor device includes determining a current longitude and latitude of the geolocation sensor device; and
providing the determined current location of the geolocation sensor device to the user of the geolocation sensor device includes providing the determined current longitude and latitude of the geolocation sensor device to the user.

14. A geolocation sensor device, comprising:
a time element configured to determine a current time of day;
an optical position sensor, wherein the optical position sensor includes a position sensitive detector configured to:
receive sunlight on a surface of the position sensitive detector; and
determine a current angular position of the sun relative to the geolocation sensor device by measuring a position of the received sunlight on the surface of the position sensitive detector;
a memory; and
a processor configured to execute executable instructions stored in the memory to determine a current location of the geolocation sensor device based, at least in part, on the determined current angular position of the sun and the determined current time of day.

15. The geolocation sensor device of claim 14, wherein the optical position sensor includes a window that covers the position sensitive detector, wherein the window includes an aperture through which the surface of the position sensitive detector receives the sunlight.

16. The geolocation sensor device of claim 15, wherein the window comprises an opaque material.

17. The geolocation sensor device of claim 14, wherein the position sensitive detector is a two-dimensional position sensitive detector.

18. The geolocation sensor device of claim 14, wherein the position sensitive detector comprises a photodiode.

* * * * *